United States Patent [19]

Moreno et al.

[11] Patent Number: 5,758,051
[45] Date of Patent: May 26, 1998

[54] METHOD AND APPARATUS FOR REORDERING MEMORY OPERATIONS IN A PROCESSOR

[75] Inventors: Jaime Humberto Moreno, Hartsdale; Mayan Moudgill, Ossining, both of N.Y.

[73] Assignee: International Business Machines Corporation, Armonk, N.Y.

[21] Appl. No.: 747,001

[22] Filed: Nov. 5, 1996

Related U.S. Application Data

[63] Continuation-in-part of Ser. No. 688,076, Jul. 30, 1996, abandoned.

[51] Int. Cl.$^6$ .................................................. G06F 11/34
[52] U.S. Cl. ............... 395/181; 395/185.03; 395/185.04
[58] Field of Search ................................ 395/181, 183.14, 395/800, 735, 185.03, 185.04; 371/67.1

[56] References Cited

U.S. PATENT DOCUMENTS 5,467,473  11/1995  Kahle et al. ............................ 395/800

OTHER PUBLICATIONS

IEEE Micro, IEEE Computer Society, Apr. 1992, pp. 40–63, "Organization of the Motorola 88110 Superscalar Risc Microprocessor", K. Diefendorff, M. Allen.

Proceedings 1986 Sigplan Symposium on Compiler Construction vol. 21, No. Jul. 1986, pp. 11–16, "Efficient Instruction Scheduling for a Pipelined Architecture" P. B. Gibbons, S. S. Muchnick.

AGM Sigplan Notices, vol. 25, No. 7, Jul. 1990, pp. 97–106, "Brief Summary Papers on Scheduling for Pipeline Processors", S. Krishnamurthy.

Dept. of Computer Science, Cornell Univ., May, 1985, "Percolation Scheduling: A Parallel Compilation Technque", Alexandru Nicolau.

IEEE Transactions on Computers, vol. 38, No. 5, May 1989, pp. 663–678, Run Time Disambiguation: Coping with Statically Unpredictable Dependencies, Alexandru Nicolau.

Annual International Symposium on Computer Architecture 1994, IEEE Computer Society Press, pp. 200–210, Speculatives Disambiguation: A Compilation Technique for Dynamic Memory Disambiguation, A. S. Huang, G. Slavenberg, J. P. Shen.

*Primary Examiner*—Phung M. Chung
*Attorney, Agent, or Firm*—Jay P. Sbrollini

[57] ABSTRACT

A computer processing system stores sequences of instructions in a memory for execution by a processor unit. An out-of-order load instruction may be created, either statically or dynamically, by moving a load instruction from its original position in a sequence of instructions to an earlier position in said sequence of instructions. Such out-of-order load instruction identifies a location in memory from which to read a datum and a first destination register in which to place the datum. The present invention is a method and corresponding apparatus that utilizes data comparison to detect coherence among memory and the datum read by an out-of-order load operation. More specifically, the method consists of an interference test which controls the processor unit to read a datum from the same location in memory identified by the out-of-order load instruction and compare the newly read datum with the datum saved in the first destination register. If the values do not match, the newly read datum is placed in a second destination register and a recovery sequence is executed. The second destination register may be identical to the first destination register. The invention is applicable to static and dynamic reordering of instructions, and can be implemented using instructions or using hardware resources.

32 Claims, 4 Drawing Sheets

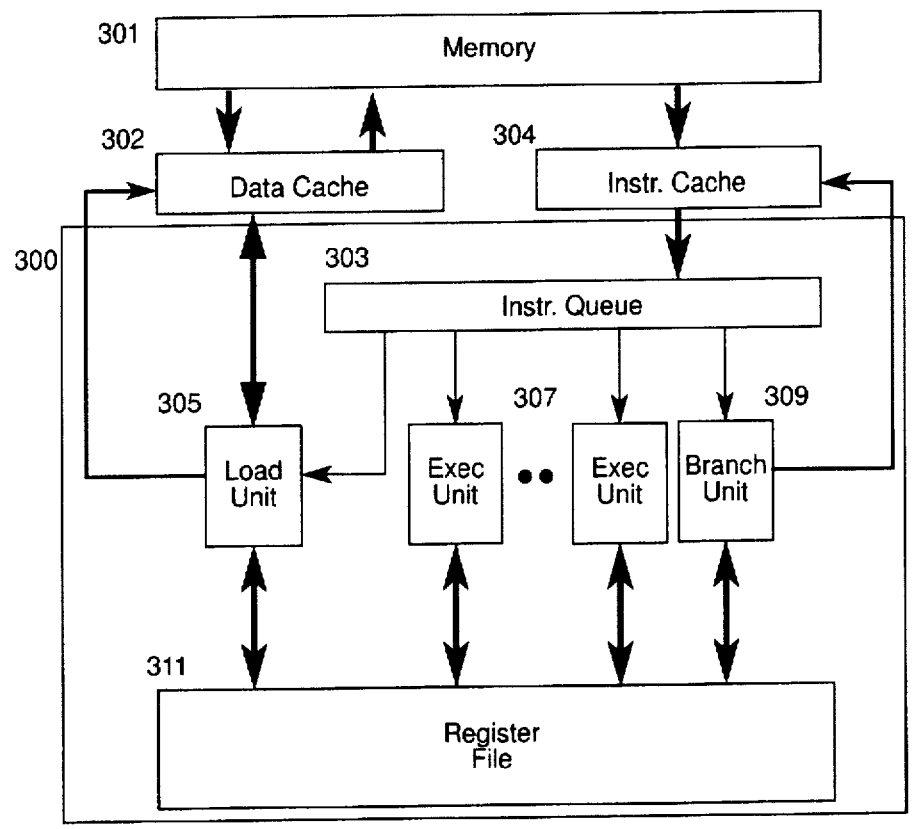
Figure 3 - Computer system
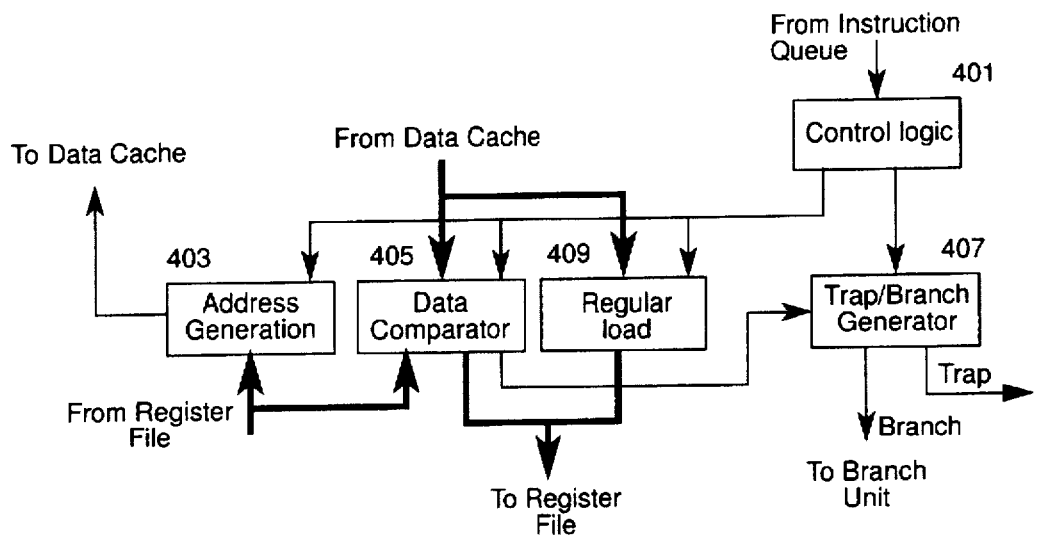
Figure 4 - Load Unit with Verify/Trap-Branch capabilities

METHOD AND APPARATUS FOR REORDERING MEMORY OPERATIONS IN A PROCESSOR

The present invention is a continuation-in-part of U.S. patent application Ser. No. 08/688,076 filed on Jul., 30, 1996, now abandoned, herein incorporated by reference in its entirety.

BACKGROUND OF THE INVENTION

1. Field of the Invention

The present invention generally relates to reordering memory operations in a processor in order to exploit instruction-level parallelism in programs and, more particularly, to a method and apparatus for executing memory load operations earlier than preceding (in program order) memory store operations. The invention is applicable to static and dynamic reordering of memory operations, is suitable for software-based and hardware-based embodiments, and is applicable in uniprocessor and multi-processor systems.

2. Background Description

Contemporary high-performance processors rely on superscalar, superpipelining, and/or very long instruction word (VLIW) techniques for exploiting instruction-level parallelism in programs; that is, for executing more than one instruction at a time. In general, these processors contain multiple functional units, execute a sequential stream of instructions, are able to fetch from memory more than one instruction per cycle, and are able to dispatch for execution more than one instruction per cycle subject to dependencies and availability of resources.

The pool of instructions from which the processor selects those that are dispatched at a given point in time is enlarged by the use of out-of-order execution. Out-of-order execution is a technique by which the operations in a sequential stream of instructions are reordered so that operations appearing later are executed earlier if the resources required by the operation are free, thus reducing the overall execution time of a program. Out-of-order execution exploits the availability of the multiple functional units by using resources otherwise idle. Reordering the execution of operations requires reordering the results produced by those operations, so that the functional behavior of the program is the same as what would be obtained if the instructions were executed in the original sequential order.

In the case of memory-related operations, a memory load operation reads a datum from memory, loads it in a processor register, and frequently starts a sequence of operations that depend on the datum loaded. Thus, in addition to using idle resources, the early (out-of-order) initiation of memory load operations may hide delays in accessing memory, including potential cache misses.

There are two basic approaches towards implementing out-of-order execution and reordering of results: dynamic reordering and static reordering. In dynamic reordering, the instructions are analyzed at execution time, and the instructions and results are reordered in hardware. In static reordering, a compiler/programmer analyzes and reorders the instructions and the results produced by those instructions when the program is generated, thus the reordering tasks are done in software. These two approaches can also be used jointly.

One factor that limits the ability to reorder operations is ambiguous memory references; this is the case when a memory load operation appears after a memory store operation in a sequential instruction stream, and it is not possible to determine ahead of time whether the memory locations accessed by the load and the store operations are different. For example, consider the following code fragment:

$$*X=(a+b+2)<<4$$

$$r=((*Y)+c)\hat{\ }d$$

wherein:
- $*X$ indicates the memory location whose address is contained in X;
- $<<$ indicates a left-shift operation; and
- $\hat{\ }$ indicates an exclusive-or (XOR) operation.

Assuming that a, b, c, and d are values stored in registers r1 through r4 of a processor, and that X and Y are in registers r8 and r9, then this code fragment can be represented by the following instruction sequence (wherein the first register after the name of the instruction is the target register, and the remaining registers are the operands):

| add | r10,r1,r2 | ;r10 = a+b |
| add | r11,r10,2 | ;r11 = a+b+2 |
| shift_left | r12,r11,4 | ;r12 = a+b+2<<4 |
| store | r12,(r8) | ;*X = a+b+2<<4 |
| load | r20,(r9) | ;r20 = *Y |
| add | r21,r20,r3 | ;r21 = *Y+c |
| xor | r22,r21,r4 | ;r22 = (*Y+c)^d |

If it can be determined that X and Y are different, then the two expressions can be scheduled for parallel execution, yielding a sequence like (wherein the symbol || denotes parallel execution):

| add | r10,r1,r2 | || | load | r20,(r9) |
| add | r11,r10,2 | | | | |
| shift_right | r12,r11,4 | || | add | r21,r20,r3 |
| store | r12,(r8) | || | xor | r22,r21,r4 |

In a machine with two execution units, the sequence above would take 4 cycles to complete (assuming that a load takes two cycles, and other operations take a single cycle).

On the other hand, if it cannot be determined whether X and Y are always different, i.e. the addresses are ambiguous, then the two expressions would have to be scheduled in the original order, taking 8 cycles (assuming again that a load takes two cycles).

The example above is not atypical; ambiguity in memory references degrades performance fairly severely by forcing the sequential execution of operations that could otherwise be executed in parallel. However, such a serialization can be avoided (that is, the load operation can be performed earlier than the store operation) as long as the datum loaded out-of-order is the same as the value that would have been loaded after the store operation. Thus, the load operation performed earlier than the store operation is valid as long as the datum loaded out-of-order is coherent with the corresponding datum in memory (i.e., has the same value) at the original point of the load operation in the instruction stream (the in-order point). Moreover, if these values are coherent, any operation that depends on the datum loaded out-of-order can also be performed out-of-order. On the other hand, if the values are not coherent, the datum loaded out-of-order and any results derived from it are invalid, making it necessary to re-execute the load operation at the in-order point, as well as the associated dependent operations.

Various attempts have been made towards solving the problem of reordering memory operations with ambiguous references by processors. Most of these schemes assume that instructions are reordered statically (i.e., when the programs are generated). All these schemes rely on comparing the address of the memory location accessed by an out-of-order load with the addresses of the memory locations accessed by succeeding store operations; if the addresses overlap, then it is assumed that the values are incoherent, so the load operation (and those operations that depend on the load which have already been executed, if applicable) must be re-executed. That is, the mechanisms monitor whether there has been any modifications to the memory location containing a datum loaded out-of-order by keeping track of memory addresses. The comparison is performed either by extra instructions (software-based schemes), or by dedicated hardware resources (hardware-based schemes) sometimes with software assistance.

To ensure correctness when addresses overlap, the existing mechanisms:

- recognize that a store instruction interfered with a load instruction executed out-of-order; and

- re-execute the load instruction, and any instruction that depends on the load which has already been executed.

For example, the code fragment given earlier could be modified as follows:

```
r = ((*Y)+c)^d
*X = (a+b+2)<<4
if (X== Y)      /* compare the address */
    r = ((*Y)+c)^d
endif
```

In the case of static reordering, the sequence of instructions generated by the compiler/programmer differs among the various schemes proposed. Usually, a load instruction which has been moved above a store instruction is replaced by some new instruction or instruction sequence which performs the load operation and starts monitoring the addresses used by store instructions; another instruction, or an instruction field in the out-of-order load instruction, is used to indicate the place where the load instruction was originally located, which determines the end of the range of monitoring for interfering store operations.

In the case of dynamic reordering, load and store instructions are presented to the processor in program order, that is, the store instruction followed by the load instruction. The processor reorders the instructions and, as in the case of static reordering, the processor must be able to detect if the store instruction writes to a memory location read by the out-of-order load operation; thus, the processor must mark the load instruction as an out-of-order operation, setup a mechanism for detecting interference from store operations, recover the state of the processor when interference is detected, and re-execute the load instruction as well as all other instructions already executed which are dependent on the load operation.

A summary of relevant related art in reordering memory operations is now set forth.

The article by K. Diefendorff and M. Allen entitled "Organization of the Motorola 88110 superscalar RISC microprocessor," IEEE Micro, April 1992, pp. 40–63, describes the dynamic scheduler in the Motorola 88110 processor which dispatches store instructions to a store queue where the store operations might stall if the operand to be stored has not yet been produced by another operation. Subsequent load instructions can bypass the store operations and immediately access the memory, achieving dynamic reordering of memory accesses. An address comparator detects address hazards and prevents load operations from going ahead of store operations to the same address. The queue holds three outstanding store operations. The structure does not really move a load earlier in the sequential execution stream, instead, it only allows for a load operation not to be delayed as a result of a stalled store operation.

A software-based mechanism for allowing load operations to be executed ahead of store operations is described by A. Nicolau in "Run-time disambiguation: coping with statically unpredictable dependencies," IEEE Trans. on Computers, vol. 38, May 1989. This approach relies on compiler identification of a load operation which can be moved ahead of a store operation, and compiler insertion of necessary code to check whether the load and store operations interfere. For each pair of ambiguous memory references, the compiler creates two versions of the code that depends on the references. One version assumes that the references interfere, whereas the other assumes they do not interfere. When the program is executed, the addresses are compared by software (instructions) to determine which version should be executed. If there is no match, the processor executes a sequence of instructions in which the load operation is executed earlier than the store operation. On the other hand, if there is a match, the processor executes a sequence of instructions in which the load operation is performed after the store operation. Since the decision is made by executing instructions, this approach leads to potential performance degradation due to the execution of more instructions. Moreover, the reordered load operation cannot be performed until the memory addresses for both load and store operations have been resolved.

A hybrid (hardware/software) memory disambiguation technique called "speculative disambiguation" was proposed by A. Huang, G. Slavenburg, and J. Shen in "Speculative disambiguation: a compilation technique for dynamic memory disambiguation," 21st Intl. Symposium on Computer Architecture, Chicago, pp. 200–210, 1994. This approach uses a combination of hardware and compiler techniques to achieve the same objective as Nicolau, supra, but reducing the overhead introduced. As in the previous one, this technique performs transformations on the code to anticipate either outcome of an ambiguous memory reference, and the compiler creates two versions of the code that depends on the memory references. The approach relies on guarded execution capabilities in the hardware. In both versions of the code, operations that do not have side effects are executed, whereas operations that have side effects are guarded by the result of comparing the two addresses. Moreover, this approach replaces explicit branches by guarded instructions, without incurring in branch penalties as in Nicolau's scheme. However, this scheme still introduces overhead in the form of more operations than the original program, in addition to requiring hardware capabilities for guarded execution.

A method and apparatus for improving the performance of out-of-order operations is described by M. Kumar, M. Ebcioglu, and E. Kronstadt in their patent application entitled "A method and apparatus for improving performance of out-of-sequence load operations in a computer system," Ser. No. 08/320,111 filed Oct. 7, 1994, as a continuation of application Ser. No. 07/880,102 filed May 6, 1992, and assigned to the assignee of this application. This method and apparatus uses compiler techniques, four new instructions, and an address-compare unit. The compiler statically moves memory load operations over memory store operations, marking them as out-of-order instructions. The addresses of operands loaded out-of-order are saved in an associative memory. On request, the address-compare unit compares the addresses saved in the associative memory with the address generated by store operations. If a conflict is detected, recovery code is executed to correct the problem. The system clears addresses saved in the associative memory when there is no longer a need to compare those addresses. This approach is hardware-intensive, and also requires special instructions to trigger the checking for conflicts in addresses as well as to clear the address of an operand no longer needed.

A method and apparatus for reordering load instructions is described in the patent application entitled "Memory processor that permits aggressive execution of load instructions" by F. Amerson, R. Gupta, V. Kathal and M. Schlansker (UK Patent Application GB 2265481A, No. 9302148.3, filed on Apr. 2, 1993). This patent application describes a memory processor for a computer system in which a compiler moves long-latency load instructions earlier in the instruction sequence, to reduce the loss of efficiency resulting from the latency of the load. The memory processor saves load instructions in a special register file for a period of time sufficient to determine if any subsequent store instruction that would have been executed prior to the load references the same address as that specified by the load instruction. If so, the memory processor reinserts the original load in the instruction stream so that it gets executed in-order. Thus, this system permits moving loads ahead of stores under compiler control, and relies on hardware to insert code to recover from a conflict. However, this system does not permit reordering other instructions that depend on the load (the hardware resources are able to reinsert only the load instruction). In other words, the method and apparatus is limited to hiding the latency of load instructions, whose maximum value must be known at compile time.

U.S. patent application Ser. No. 08/435,411, filed May 10, 1995, in the name of Ebcioglu et al., assigned to the assignee of the application, combines reordering of memory operations with speculative execution of memory operations. The reordering of the memory operations relies on:

* static reordering of code by the compiler to exploit instruction-level parallelism;
* special hardware support to detect conflicts in memory references and manipulate data loaded out-of-order; and
* compiler-generated code for operating on the data loaded out-of-order and for recovering from the detection of conflicts.

The special hardware support consists of an address register for each register which can be the destination for the result of a load operation executed out-of-order, a comparator associated with each such address register, and special instructions to load a datum out-of-order and to "commit" such datum as well as any other values derived from it at in-order points in the program. Each out-of-order load records in the corresponding address register the memory address and size of the datum loaded, each store operation triggers the comparison of the (address, size) tuple against the contents of all address registers. If any such comparison is true, then the corresponding address register is marked as invalid. A special commit instruction is executed at the in-order point, which checks whether the associated address register is valid, if so, the datum loaded out-of-order and the datum in memory are coherent. On the other hand, if the address register is invalid, then the datum loaded out-of-order and the memory contents are not coherent, so that the load operation as well as any other operation must be re-executed. A trap is invoked at that time, transferring execution control to recovery code produced by the compiler which re-executes the load operation as well as the dependent operations.

U.S. Pat. No. 5,421,022 entitled "Apparatus and method for speculatively executing instructions in a computer system" issued on May 30, 1995 in the name of F. McKeen et al., describes an apparatus usable in the case of statically reordered ambiguous memory operations, which relies on content-addressable memories (CAM) to compare the address of every executed store operation with the address of every outstanding out-of-order load instruction. If an overlap is detected, the apparatus treats the out-of-order load as if it caused an exception, effectively causing the re-execution of the load operation at its in-order point, in its in-order (or precise) state. Similarly, U.S. Pat. No. 5,420,990 entitled "Mechanism for enforcing the correct order of instruction execution," also issued on May 30, 1995 in the name of F. McKeen et al., describes an apparatus closely related to the one proposed in U.S. Pat. No. 5,421,022 but usable in the case of memory operations reordered dynamically by the processor; this apparatus also relies on content-addressable memories.

3. Problems with State of the Art

Static (software-based) techniques to reorder memory references suffer from large overhead, in the form of additional instructions that must be executed to discover interference. Specifically, a load instruction needs to be checked against every ambiguous store instruction over which it is moved. For example, consider the case of moving a load instruction over several store instructions as in the following sequence:

store r7,(r21)
store r8,(r22)
store r9,(r23)
load r15,(r25)

In this case, the interference test requires comparing the address in register r25 with the addresses in registers r21,r22 and r23. Thus, the interference test requires at least five instructions, and may require many more (depending on the primitives for performing the comparisons and for combining several comparisons).

Moreover, if load and store instructions are byte-aligned (i.e. load and store instructions access data at any byte boundary in memory, and the data accessed is more than one byte), or if load and store instructions access entities of different size (different number of memory bytes), then the test is more complicated. Instead of checking just for equality in the addresses, the interference test must check for address overlap. Thus, assuming for example that rY contains the address used in an out-of-order load instruction and rX contains the address used in a succeeding store instruction, then the test will consist of checking that rY−rX is less than the number of bytes stored by the store instruction, and that rX−rY is greater or equal than the number of bytes accessed by the load instruction. This test could take four instructions, as illustrated in the following example (wherein cc0 and cc1 are condition registers set by the corresponding instructions):

| sub   r5,rY,rX              | ;Y−X                          |
|-----------------------------|-------------------------------|
| cmp<  cc0,r10,size_of_store | ;Y−X < size_of_store          |
| cmp>=cc1,r10,size_of_load   | ;Y−X >= size_of_load          |
| cc_and cc0,cc0,cc1          | ;(Y−X < . .) && (Y−X >= . .)  |

Moreover, there are cases in which comparing addresses in software is not sufficient. This situation can arise, for example, when there are other sources of store operations into memory besides the particular program. This is the case, for instance, of a multitasking or a multiprocessor system. The following example illustrates this situation, which corresponds to the execution of a different instruction stream on two processors of a multiprocessor system with firmly-consistent memory model:

| Processor A | Processor B |
|---|---|
| *X = 1 | *Y = 1 |
| r = *Y | s = *X |
| print r | print s |

Assume that initially both memory locations X and Y contain the value 0. Due to the firmly-consistent memory model, it is impossible for both r and s to be 0. On the other hand, software-based reordering and disambiguation leads to

| Processor A | Processor B |
|---|---|
| r = *Y | s = *X |
| *X = 1 | *Y = 1 |
| if (X == Y) | if (X == Y) |
| r = *Y | s = *X |
| endif | endif |
| print r | print s |

In these program fragments, if X and Y are different, r and s can both be 0, which is incorrect.

Hardware-assisted or hardware-only options avoid the overhead arising from executing extra instructions by saving the memory address used by out-of-order load instructions in special hardware resources (comparator registers), and continually checking the contents of those registers for overlap against the addresses of store instructions. In other words, hardware monitoring implements the following functionality:

| | |
|---|---|
| load r10,(r20) | ;out-of-order load |
| start_monitoring(r20) | ;setup monitoring hardware |
| store r5,(r21) | |
| detect_overlap(r21) | ;interference test |

The resources required for hardware monitoring are complex and expensive. In every cycle, such resources must compare the address of each store operation issued in that cycle (assuming that one or more operations can be issued simultaneously) with all outstanding out-of-order load operations (i.e., those that have not yet reached their in-order point). This functionality can be achieved by using content-addressable memories, special register files, or multiple comparators, as illustrated by the examples of prior art given earlier. However, hardware resources can only save (and compare against) a fixed number of out-of-order load addresses at any one point. Usually, this is a small number, so that only a limited (fixed) number of load operations can be executed out-of-order at any point in time. Such a fixed bound implies that an out-of-order load instruction cannot be issued as soon as a load unit becomes available to execute it; instead, the address checking hardware must also have resources available to save the address generated. This limitation adds complexity to the dispatch mechanism in the case of dynamic reordering, or restricts the number of ambiguous load instructions that can be moved out-of-order in the case of static reordering (i.e., the compiler must ensure that, at any given time, no more ambiguous load instructions have been moved over store instructions than the number of monitors available).

Another problem of existing solutions, both software-only and hardware-assisted, is dealing with asynchronous memory references. It is possible to make monitoring hardware support asynchronous load instructions on a multiprocessor system. This requires that the monitoring hardware uses the cache-memory coherence hardware provided by the multiprocessor system (for detecting interfering store operations on other processors), implying even more complex hardware. Moreover, if the cache-coherence hardware provides information only at the level of cache-lines rather than smaller entities, as is usually the case, then spurious interferences are detected.

Furthermore, monitoring hardware must continue detecting changes that occur even when the corresponding program which set them has been swapped out of the processor, as on a context switch. In other words, the monitoring hardware must be capable of monitoring all existing program contexts, including those suspended. Since this is an extremely expensive and difficult proposition, as an alternative, after a context switch the monitoring hardware can mark all out-of-order loads as interfering. This leads to higher overhead, since the recovery code must be re-executed for all loads that were being monitored at the context switch.

In addition, if the page-table is modified in the case of virtual memory systems, it may be difficult to determine what new address should be monitored. As in the case above, the monitoring hardware can report interference and introduce the corresponding performance penalty.

From the previous discussion, it follows that address comparison is not a sufficiently adequate test to detect correct behavior in the case of reordered memory references (i.e., detect coherence among a value loaded out-of-order and the value in memory at the original position of the load instruction in the sequential stream).

SUMMARY OF THE INVENTION

The problems stated above and the related problems of the prior art are solved with the principles of the present invention, a method and apparatus for reordering memory operations in a processor.

A computer processing system stores sequences of instructions in a memory for execution by a processor unit. An out-of-order load instruction may be created, either statically or dynamically, by moving a load instruction from its original position in a sequence of instructions to an earlier position in said sequence of instructions. Such out-of-order load instruction identifies a location in memory from which to read a datum, and a first destination register in which to place the datum.

The present invention is a method and corresponding apparatus that utilizes data comparison to detect coherence among memory and the datum read by an out-of-order load operation. More specifically, the method consists of an interference test which controls the processor unit to read a datum from the same location in memory identified by the out-of-order load instruction and compare the newly read datum with the datum saved in the first destination register. If the values do not match, the newly read datum may be placed in a second destination register, and a recovery sequence is executed. The execution of the recovery sequence may be initiated by an exception signal, a trap or a branch operation. The second destination register, if specified, may be identical to the first destination register.

The interference test of the present invention may be implemented by hardware resources in the processor, or may be implemented as instructions executed by the processor. In the case of implemented as instructions, the interference test may consist of a new single instruction, or may be composed of existing instructions (such as a load instruction and a compare and trap instruction, or a load instruction, a compare instruction and a branch instruction). The choice of implementation of the interference test is dependent on whether reordering of memory operations is performed statically or dynamically.

BRIEF DESCRIPTION OF THE DRAWING

FIG. 3 is a functional block diagram of a computer processing system supporting static reordering of memory operations and software-based implementation of the interference test and recovery sequence.

FIG. 4 is a block diagram showing the hardware resources supporting the execution of out-of-order load operations according to the system illustrated by FIG. 3.

DETAILED DESCRIPTION OF PREFERRED EMBODIMENTS OF THE INVENTION

Figure 1:
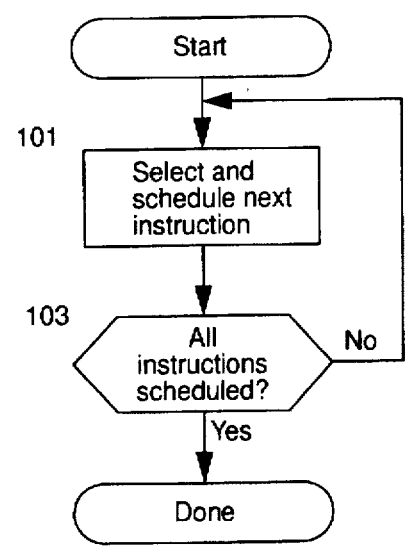
FIG. 1 is a flow diagram describing the scheduling of instructions without performing reordering of memory operations.

Referring now to the drawings, and more particularly to FIG. 1, there is shown a flow diagram of the scheduling of instructions when reordering of operations is performed, either statically or dynamically, but only if such a reordering is not subject to ambiguities.

In step 101, the next instruction is selected and moved from its current position in the sequential stream of instructions to an earlier position (i.e., the instruction is "scheduled" for execution), if such a movement is advantageous and does not affect the correctness of the program. That is, the selected instruction is moved to an earlier point if the instruction does not depend on any of the instructions over which it is moved.

In step 103, it is determined whether there are instructions left to be scheduled, in which case the process returns to step 101, otherwise the process terminates.

Figure 2A:
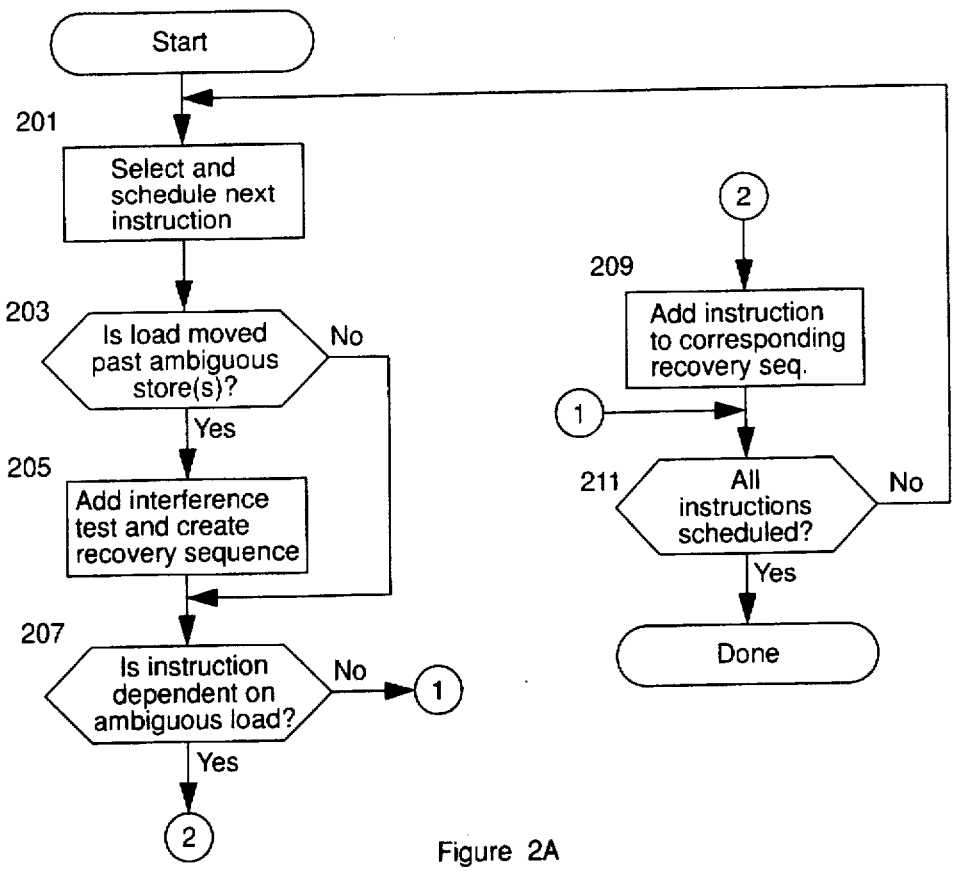
FIGS. 2A and 2B are flow diagrams illustrating the reordering of memory references according to the present invention.

FIG. 2A depicts how any scheduling technique can be extended to handle disambiguation according to the present invention; note that this general scheme is applicable to all techniques that implement disambiguation, either static or dynamic.

In step 201, the next instruction is selected and moved from its current position in the sequential stream of instructions to an earlier position (i.e., the instruction is scheduled for execution).

In step 203, it is determined whether the instruction was a load, and if so, whether the instruction was moved over a store instruction -or any other instruction- from which the load instruction depends on ambiguously. If either of these conditions is false, then the process continues in step 207. If in step 203 it was determined that the instruction was a load instruction and it was moved over a store instruction from which it depends on ambiguously, then the process continues to step 205.

In step 205, actions dealing with disambiguation are performed; these include, but are not restricted to, adding a test for interference among the load and the store instructions, and setting up a recovery sequence.

In step 207, it is determined whether the instruction selected in step 201 uses directly or transitively the result of an ambiguous load (an instruction uses transitively the result of an ambiguous load if it uses the result of another instruction that directly or transitively uses the result of that ambiguous load). In addition, in step 207 is determined whether the instruction selected in step 201 has been moved above the interference test for that ambiguous load. If either of these conditions is false, the process continues in step 211.

If in step 207 it was determined that the instruction used directly or transitively the result of an ambiguous load, and the instruction was moved above the interference test for that ambiguous load, then in step 209 the instruction is made part of the recovery sequence associated with the ambiguous load.

In step 211, it is determined whether there are instructions left to be scheduled, in which case the process returns to step 211, otherwise the process terminates.

The interference test added in step 205 consists of a mechanism (either hardware-based, one instruction, or a sequence of instructions) which reloads the value from the memory location read by the out-of-order load, compares the reloaded value with the value originally loaded by the out-of-order load, and invokes the recovery sequence if the values are different (i.e. non-coherent). A more detailed description of this interference test is set forth below.

Figure 2B:
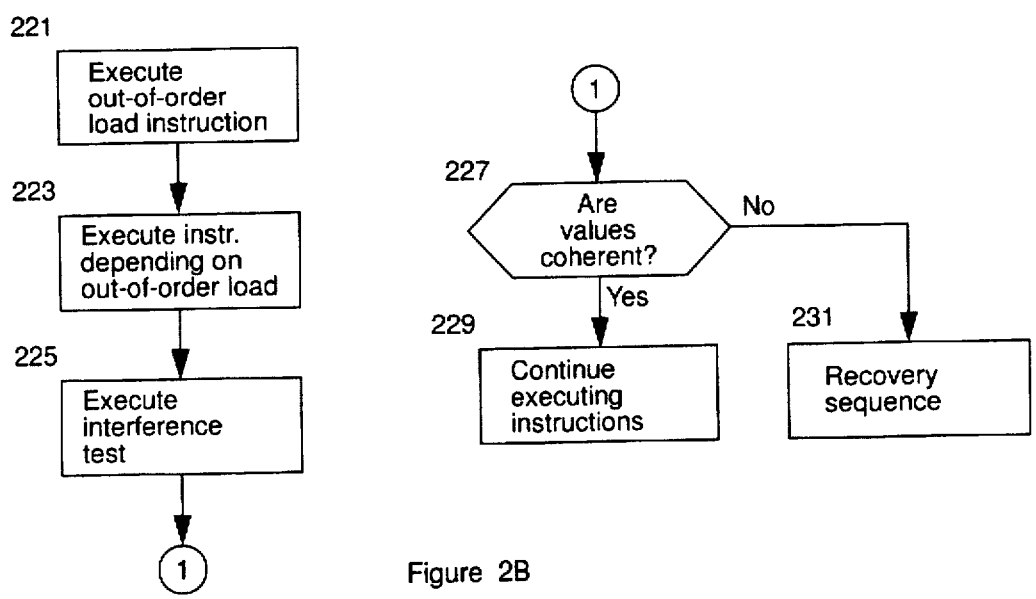

FIG. 2B illustrates the operations required at execution time by the out-of-order instructions according to the present invention. In step 221, an out-of-order load instruction is executed thereby reading a datum and storing the datum in the assigned register. In step 223, instructions that depend upon the out-of-order load operation may be executed (also out-of-order). In step 225, the interference test is executed thereby loading a datum from the memory location addressed by the out-of-order load instruction, and comparing the datum loaded with the datum stored in the register assigned to the out-of-order load instruction. The coherence among the two values is verified in step 227. If the two values are equal, then the datum read out-of-order is coherent with the datum in memory at the in-order point, and the out-of-order load as well as all the operations which depend on the datum loaded out-of-order are valid. In such a case, the process continues in step 229 wherein the processor continues executing the instructions in the program. However, if the two values are not equal, then the datum loaded out-of-order is not coherent with the value in memory at the in-order point (the datum has changed), so that the result of the out-of-order load as well as from all other executed operations which depend on the load are incorrect and must be re-executed. In this case, the interference test controls the computer processing system to activate the recovery sequence, as indicated in step 231. The recovery sequence re-executes those operations that depend on the load executed in step 221; the operations in this recovery sequence may use the datum loaded by the interference test.

The recovery sequence may be a sequence of instructions generated statically (by the compiler, programmer, or other means), or may be generated by hardware resources in the processor. In the case of an interference test executed by instructions and a statically generated recovery sequence, the starting address of the recovery sequence may be specified in the interference test 225; alternatively, the interference test can generate a program trap so that execution control is automatically transferred to a trap-handler which either contains the instructions composing the recovery sequence, or is used to branch into such instructions.

EMBODIMENT USING STATIC SCHEDULING AND INSTRUCTIONS FOR THE INTERFERENCE TEST

In order to illustrate possible implementations of the interference test of the present invention using static scheduling and instructions for the interference test, consider examples wherein the desired functionality of the interference test is implemented at the word level. The examples utilize the following notation:

- RT, RA identify general purpose registers;
- (RT), (RA) are the contents of general-purpose registers RT and RA, respectively;
- D, BD are a data displacement and a branch displacement, respectively; and
- CIA, NIA are the address of the instruction currently being executed and the address of the next instruction to be executed, respectively.

One exemplary implementation of a software-based interference test consists of a Load Word and Verify/Trap instruction, whose definition is given below. In this case, the interference test invokes a system trap handler if the newly loaded datum is incoherent with the datum loaded out-of-order.

```
Load Word and Verify/Trap    lwvt RT, D(RA)
EA <= (RA) + D
s <= MEM(EA,4)
if (s#(RT))then          ;# :compare not equal
    RT <= s
    TRAP
```

EA is the memory address referenced by the instruction. A word (4 bytes) is read starting from address EA and compared with the contents of register RT. If the values are equal, execution continues with the next instruction in sequence. Otherwise, if the values are not equal, the new value is placed in the register RT and a trap is generated. This trap may be identified by the memory address where the lwvt instruction is located; alternatively, the trap may be identified by a unique identifier specified in the lwvt instruction.

Another example of a software-based implementation of the interference test consists of a Load Word and Verify/Branch instruction, whose definition is given below. In this case, the interference test generates a branch to the memory location specified by the instruction if the newly loaded datum is incoherent with the datum loaded out-of-order.

```
Load Word and Verify/Branch    lwvb RT, RA, BD
EA <= (RA)
s <= MEM(EA ,4)
if (s #(RT) ) then       ;# :compare not equal
    RT <= s
    NIA <= CIA + BD
```

EA is the memory address referenced by the instruction. A word (4 bytes) is read from the address EA and compared with the contents of register RT. If the values are equal, execution continues with the next instruction in sequence. Otherwise, if the values are not equal, the new value is placed in the register RT and execution branches to the instruction stored at the memory location CIA+BD.

In order to illustrate the static generation of the interference test of the present invention (the Load and Verify instruction) and its execution, consider the (original) code shown below in the left-hand column which contains a load instruction below a store instruction, and some arithmetic instructions that depend on the load. (In this example, the first register after the name of the instruction is the target register, whereas the remaining registers are the operands.)

| Original Code | | Load Instruction Moved Above Store Instruction | |
|---|---|---|---|
| ... | | load | r5,10(r4) |
| ... | | add | r35,r4,10 |
| ... | | ... | |
| store | r3,20(r2) | store | r3,20(r2) |
| ... | | ... | |
| load | r5,10(r4) | lwvb | r5,r35,$recvry |
| add | r6,r5,20 | add | r6,r5,20 |
| sub | r7,r6,r7 | sub | r7,r6,r7 |
| $next | ... | $next | ... |

The load instruction is moved over the store instruction, as depicted in the right-hand column. In this example, since the lwvb instruction does not allow the specification of a displacement value, the address of the load operation is computed with an add instruction and saved in register r35. The original load instruction is replaced by a Load and Verify/Branch instruction (lwvb), as shown in the right-hand column, which uses the address saved in register r35. The arithmetic instructions that follow the original load instruction may also be reordered, as shown below:

| Original Code | | Operations Moved Above Store Instruction | |
|---|---|---|---|
| ... | | load | r5,10(r4) |
| ... | | add | r35,r4,10 |
| ... | | add | r6,r5,20 |
| ... | | sub | r7,r6,r7 |
| ... | | ... | |
| store | r3,20(r2) | store | r3,20(r2) |
| load | r5,10(r4) | lwvb | r5,r35,$recvry |
| add | r6,r5,20 $next: | ... | |
| sub | r7,r6,r7 | | |
| $next: | ... | | |

In this case, the instructions that depend on the load operation are also moved over the store instruction, as shown in the right-hand column.

In the code sequences above, if the Load and Verify/Branch instruction determines that the datum previously loaded into r5 is incoherent with the datum loaded by the Load and Verify/Branch instruction, execution branches to the recovery sequence. The instructions composing the recovery code sequence for the example above are:

| Recovery Code | | |
|---|---|---|
| $recvry: | add | r6,r5,20 |
| | sub | r7,r6,r7 |
| | branch | $next |

The recovery sequence consists of every instruction which depends on the out-of-order load and which was also executed out-of-order; the sequence ends by branching to continue execution at the instruction that follows the Load and Verify/Branch instruction.

In an alternative embodiment, the interference test (Load and Verify/instruction) may specify a register containing the datum loaded out-of-order and a different register as the destination register for the interference test. In addition, register renaming techniques may be used with respect to the reordered arithmetic instructions that follow the original load instruction. The code sequences below illustrate this alternative embodiment:

| Original Code | | Operations Moved Above Store Instruction | |
|---|---|---|---|
| ... | | load | r5,10(r4) |
| ... | | add | r35,r4,10 |
| ... | | add | r26,r5,20 |
| ... | | sub | r27,r26,r27 |
| store | r3,20(r2) | store | r3,20(r2) |
| ... | | ... | |
| load | r5,10(r4) | lwvb | r5,r25,r35,$recvry |
| add | r6,r5,20 | copy | r6,r26 |
| sub | r7,r6,r7 | copy | r7,r27 |
| $next: | ... | $next: | ... |

As shown in the right-hand column, the Load and Verify instruction specifies the destination register (r5) of the reordered load instruction and a destination register (r25) for the interference test. In addition, register renaming techniques are used for those instructions that depend on the load and which have been moved over the store instruction. When executed, the Load and Verify/Branch instruction loads the datum from the memory location specified by r35 and determines if the newly load datum is coherent with the datum previously loaded into r5. If a non-coherent condition occurs, the newly loaded datum is stored in register r25 and execution branches to a recovery sequence which contains the following instructions:

| Recovery Code | | |
|---|---|---|
| $recvry: | add | r26,r25,20 |
| | sub | r27,r26,r27 |
| | copy | r6,r26 |
| | copy | r7,r27 |
| | branch | $next |

A processor provided with hardware resources to support statically reordered instructions including ambiguous load operations as described above is shown in FIG. 3. The system consists of a memory subsystem 301; a data cache 302; an instruction cache 304; and a processor unit 300. The processor unit 300 includes an instruction queue 303; one or more load units 305 (one shown); several execution units 307 that perform integer, logic and floating-point operations; a branch unit 309; and a register file 311. Instructions are fetched from the instruction cache 304 (or the memory subsystem 301 if not in the instruction cache) under control of the branch unit 309 and are placed in the instruction queue 303. Instructions are dispatched from the instruction queue 303 to the load unit(s) 305, execution units 307 and branch unit 309 for execution. These units interact with the register file 311 to access the operands used by the instructions and save the results produced by the execution of the instructions. The register file 311 typically includes general-purpose registers (GPRs), floating-point registers (FPRs), and condition registers (CRs). The load unit(s) 305 also interacts with the data cache 302 and the memory subsystem 301, to load data used by the instructions that are executed by the execution units 307 and/or branch unit 309, and to store results generated by the execution units.

According to the present invention, as shown in FIG. 4, at least one load unit 305 includes control logic 401, address generation logic 403, comparison logic 405 and a trap/branch generator 407.

In a first mode of operation, when processing a regular load instruction, the address generation logic 403 generates a memory address from which to read a datum. Depending upon the specific format of the load instruction, the memory address may be generated based on operand(s) read from register(s) of the register file 311 as specified in the load instruction, or may be generated based on operand(s) read from register(s) of the register file 311 and displacement information as specified in the load instruction. The address generation logic 403 then forwards the generated memory address to the data cache 302. The requested datum is read from the data cache 302 or from the memory subsystem 301 (if not present in the data cache), returned and written to the destination register in the register file 311 through the path for a regular load 409.

In a second mode of operation, when processing the Load and Verify instruction (interference test) of the present invention, the address generation logic 403 generates a memory address from which to read a datum. Depending upon the specific format of the Load and Verify instruction, the memory address may be generated based on operand(s) read from register(s) of the register file 311 specified in the Load and Verify instruction (such as for the Load and Verify/Branch example above), or may be generated based on operand(s) read from register(s) of the register file 311 and displacement information specified in the Load and Verify instruction (such as for the Load and Verify/Trap example above). The address generation logic 403 then forwards the generated memory address to the data cache 302. The requested datum is read from the data cache 302, or from the memory subsystem 301 (if not present in the data cache), and returned to the comparison logic 405. The comparison logic 405 compares the datum read from the data cache (or memory subsystem) with the datum saved in the destination register of the Load and Verify instruction, which is also the destination register of the out-of-order load instruction. If the two values are identical, no further action is performed. However, if the two values are not identical, the comparison logic 405 writes the datum read from the data cache 302 (or from the memory subsystem 301) into the destination register in the register file 311 specified by the Load and Verify instruction, and also signals the trap/branch generator 407 indicating that a non-coherent condition has been detected. Upon receiving of the signal from the comparison logic 405 indicating the non-coherent condition, the trap/branch generator 407 controls the processor unit 300 to execute a recovery sequence; this function may be accomplished, for example, by generating a request to invoke the system trap handler (Load and Verify/Trap Instruction) or by generating a request to branch to the memory address identified by the displacement information contained in the Load and Verify instruction along with the address of the current instruction (Load and Verify/Branch Instruction). The trap request is forwarded to the system trap handler, which invokes the recovery code identified by the specific trap request. In the alternative, the branch request is forwarded to the branch unit 309 which causes the operation of the system to branch to the recovery sequence. Other mechanisms may be used by the trap/branch generator 407 to control the processor unit 300 to execute the recovery code sequence upon receiving of the signal from the comparison logic 405 indicating the non-coherent condition.

The embodiment described above introduces one extra instruction (the Load and verify operation) for each load operation moved out-of-order. Although this is overhead with respect to the original program, there is no penalty (either hardware cost or execution overhead) when store operations are performed; this is in contrast to previously proposed mechanisms, which must monitor all store operations. Moreover, since the decision to move a load operation out-of-order is made when the program is generated, the impact of the overhead can be weighted against the expected benefits of performing the move.

In another alternative embodiment, the interference test of the present invention may be implemented using resources (instructions) already available in some contemporary processors at the cost of larger overhead in the execution of a program. For example, the interference test may be formed by a traditional load operation followed by a compare-and-trap instruction, such as the TRAP instruction available in the PowerPC architecture. In this case, the in-order datum is loaded with the traditional load instruction, and this datum is compared with the datum loaded out-of-order using the Compare-and-trap instruction. As above, if the two values are equal then the out-of-order datum is coherent with the datum in memory at the in-order point, and the load as well as all the operations which depend on the data loaded out-of-order are valid. On the other hand, if the two values are not equal, then a program-trap is generated, and execution control is automatically transferred to a trap-handler (as above).

In another alternative embodiment, the interference test of the present invention may be formed by a traditional load operation followed by a Compare-equal operation and a Branch-if-false (conditional branch) operation. In this case, the in-order datum is loaded with the regular load instruction, and this datum is compared with the datum loaded out-of-order using the Compare-equal instruction, which sets a condition in the processor. The result of the comparison (the condition) is tested by the Branch-if-false instruction. If the two values are equal, then the Compare-equal operation sets the condition to true, otherwise it sets it to false. The Branch-if-false checks the condition; if false, execution control is transferred to a recovery sequence, wherein the operations that depend on the datum are re-executed.

EMBODIMENT USING DYNAMIC SCHEDULING AND HARDWARE RESOURCES FOR THE INTERFERENCE TEST

A conventional implementation of a processor capable of dynamically scheduling instruction (an out-of-order issue processor) includes the following features:

1. A mechanism for issuing instructions out-of-order, including the ability to detect dependencies among the instructions, rename the registers used by an instruction, and detect the availability of the resources used by an instruction.
2. A mechanism for maintaining the out-of-order state of the processor, which reflects the effects of instructions as they are executed (out-of-order).
3. A mechanism for retiring instructions in program order, simultaneously updating the in-order state with the effects of the instruction being retired.
4. A mechanism for retiring an instruction in program order without updating the in-order state (effectively canceling the effects of the instruction being retired), and for resuming in-order execution of the program starting at the instruction being retired (which implies canceling all the effects present in the out-of-order state).

Mechanism 3 from the list above is used to retire instructions when the effects of the instruction being retired are correct. Mechanism 4 is used instead, whenever there is some abnormal condition resulting from the execution of the instruction being retired or from some external event.

Figure 5:
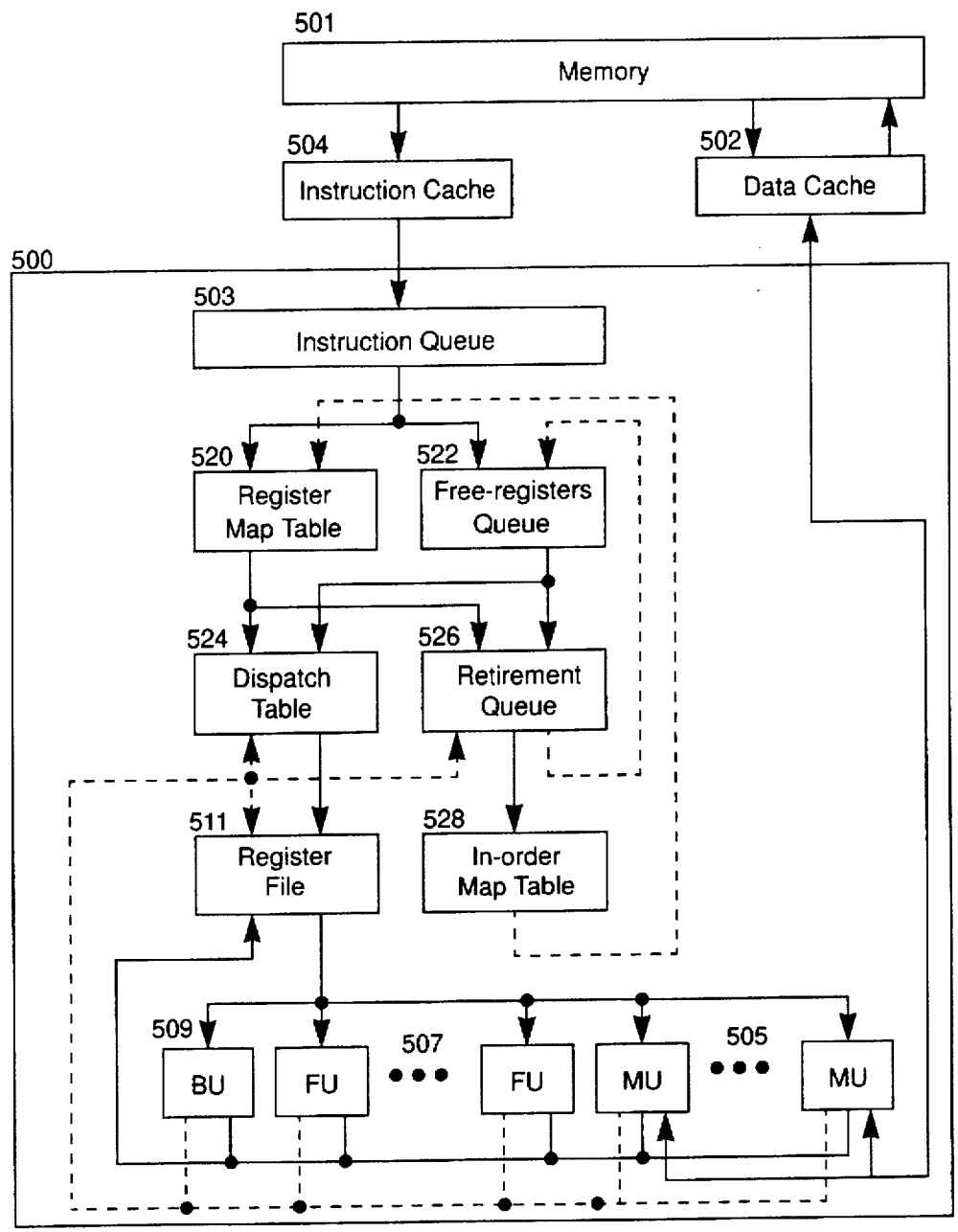
FIG. 5 is a functional block diagram of a computer processing system supporting dynamic reordering of memory operations and hardware-based implementation of the interference test and recovery sequence.

A superscalar processor provided with hardware resources to support reordering of instructions using the mechanisms listed above, but excluding the execution of load operations earlier than preceding store operations, is shown in FIG. 5. The system consists of a memory subsystem 501; a data cache 502; an instruction cache 504; and a processor unit 500. The processor unit 500 includes an instruction queue 503; several memory units 505 that perform load and store operations; several functional units 507 that perform integer, logic and floating-point operations; a branch unit 509; a register file 511; a register map table 520; a free-registers queue 522; a dispatch table 524; a retirement queue 526; and an in-order map table 528. This exemplary organization is based on the one described by M. Moudgill, K. Pingali, S. Vassiliadis in "Register renaming and dynamic speculation: an alternative approach," in Proceedings of the 26th Annual International Symposium on Microarchitecture, pp. 202–213, December 1993.

In the processor depicted in FIG. 5, instructions are fetched from the instruction cache 504 (or the memory subsystem 501 if not in the instruction cache) under control of the branch unit 509, and are placed in the instruction queue 503. Instructions are extracted from the instruction queue 503. The architected registers names used by the instructions for specifying the operands are renamed according to the contents of the register map table 520, which specifies the current mapping from architected register names to physical registers. The architected registers names used by the instructions for specifying the destinations for the results are assigned physical registers extracted from the free-register queue 507, which contains the names of physical registers not currently being used by the processor. The register map table 520 is updated with the assignments of physical registers to the architected destination register names specified by the instructions. Instructions with all their registers renamed are placed in the dispatch table 524; instructions are also placed in the retirement queue 526, in program order, including their addresses, their physical and their architected register names. Instructions are dispatched from the dispatch table 524 when all the resources used by the instructions are available (physical registers have been assigned the expected operands, and functional units are free). The operands used by the instruction are read from the register file 511, which typically includes general-purpose registers (GPRs), floating-point registers (FPRs), and Condition Registers (CRs). Instructions are executed, potentially out-of-order, in a corresponding memory unit 505, functional unit 507, or branch unit 509. Upon completion of execution, the results from the instructions are placed in the register file 511. Instructions in the dispatch table 524 waiting for the physical registers set by the instructions completing execution are notified. The retirement queue 526 is notified of the instructions completing execution, including whether they raised any exceptions. Completed instructions are removed from the retirement queue 526, in program order (from the head of the queue). At retirement time, if no exceptions were raised by an instruction, the in-order map table 528 is updated so that architected register names point to the physical registers in the register file 511 containing the results from the instruction being retired; the previous register names from the in-order map table 528 are returned to the free-registers queue 522. On the other hand, if an instruction has raised an exception, program control is set to the address of the instruction being retired from the retirement queue 526; the retirement queue 526 is cleared (flushed), thus canceling all unretired instructions; the register map table 520 is set to the contents of the in-order map table 528; and any register not in the in-order map table 528 is added to the free-registers queue 522.

In addition to the components above, superscalar processors may contain other components such as branch-history tables to predict the outcome of branches.

According to the present invention, a superscalar processor that supports reordering of load instructions with respect to preceding store instructions is augmented with the following:

1. A mechanism for marking load instructions which are issued out-of-order with respect to preceding store instructions (marking out-of-order load operations).
2. A mechanism for performing an interference test, which consists of re-executing an out-of-order load instruction just before it is retired, and comparing the value just loaded with the value loaded out-of-order.
3. A mechanism for retiring a load instruction using the datum loaded by mechanism (2), instead of the datum in the corresponding out-of-order state, and for resuming in-order execution of the program starting at the instruction that follows the load instruction being retired (which implies canceling all the effects present in the out-of-order state).

The mechanisms provided by this invention are used in conjunction with the mechanisms available in the conventional out-of-order processor depicted in FIG. 5, as follows. A load instruction may be dispatched from the dispatch table 524 earlier than a preceding store instruction. Such a load instruction is denoted below as an "out-of-order" load operation. In such case, the entry in the retirement queue 526 corresponding to the load instruction is marked as an out-of-order load. The interference test provided by this invention is activated when an out-of-order load is retired from the retirement queue 526. The interference test re-executes the out-of-order load instruction using one of the memory units 505, and compares the value loaded with the value loaded by the out-of-order load instruction which is saved in the physical register in the register file 511 specified by the out-of-order load instruction as destination. Issuing and completion of instructions continues while the interference test is in progress, but no further retirement of instructions from the retirement queue 526 is possible until the interference test completes. If the interference test determines that the value loaded out-of-order and saved in the register file 511 is equal to the value read from the data cache 502 (or in the memory 501 if not present in the data cache), the out-of-order instruction is retired normally from the retirement queue 526, and retirement of other instructions continues. On the other hand, if the interference test determines that the values are not equal, then the instruction is treated as generating an out-of-order exception.

The detection of the dispatching of an out-of order load operation from the dispatch table 524 to a memory unit 505 for execution is preferably accomplished with two counters, a "stores-fetched counter" and a "stores-dispatched counter". The stores-fetched counter is incremented when a store operation is added to the dispatch table 524. The stores-dispatched counter is incremented when a store operation is sent to a memory unit 505 for execution. The current contents of the stores-fetched counter is attached to a load instruction when the load instruction is added to the dispatch table 524. When the load instruction is dispatched from the dispatch table 524 to a memory unit 505 for execution, if the value attached to the load instruction in the dispatch table 524 is different from the contents of the stores-dispatched counter at that time, the load instruction is identified as an out-of-order load operation. Note that the difference among the two counter values corresponds to the exact number of store operations with respect to which the load instruction is being issued out-of-order.

Upon detection of the dispatching of an out-of order load operation, the interference test of the present invention is initiated by storing a modified version of the load instruction in the dispatch table 524 in place of the dispatched load instruction. Preferably, the modified version of the load instruction is equivalent in functionality to the load verify instruction used in the software-based implementation of this invention described above. In addition, when the memory unit 505 completes execution of the out-of-order load instruction, the corresponding entry is not marked as completed in the retirement queue 526.

In addition, the load verify instruction stored in the dispatch table 524 is dispatched to a memory unit 505 for execution. When executed, the load verify instruction performs a load operation, which reloads the datum read by the out-of-order load operation, and performs a compare operation, which compares the value read with the datum previously loaded and saved in the register file 511; if the values are the same, the out-of-order load instruction in the retirement queue 526 is marked as completed; otherwise, the datum read by the load verify operation is placed in the destination physical register in the register file 511, and the out-of-order load instruction in the retirement queue 526 is marked as having generated an out-of-order exception.

The retirement from the retirement queue 526 of a load instruction marked as having an out-of-order exception leads to recovery actions as for any other exception generated by an instruction, with the following modifications:

- the entry in the in-order map table 528 for the architected destination register specified in the load instruction is updated with the name of the physical register used by the instruction before updating the register map table 520 with the contents of the in-order map table 528; and
- instruction execution is restarted at the instruction that follows the load instruction in program order.

A drawback of this embodiment is the introduction of an additional memory access for each out-of-order load instruction (i.e., the interference test). However, such a drawback is not so severe because program execution can continue while the reload operation is in progress, with results being placed in the out-of-order state. Moreover, since the additional memory operations reference locations which were accessed by the corresponding out-of-order load instructions rather recently, there is extremely low probability of encountering a long latency (a cache miss) during the interference test.

An alternative embodiment of this invention may treat all load operations as out-of-order, without requiring marking them as such, thus leading to a simpler implementation but doubling the number of memory accesses between the processor and the data cache.

While the invention has been described above with respect to particular embodiments thereof, those skilled in the art will recognize that the invention can be practiced with modification within the spirit and scope of the appended claims.

Having thus described our invention, what we claim as new and desire to secure by Letters Patent is as follows:

1. In a computer processing system wherein sequences of instructions are executed by a processor unit, wherein at least one of said instructions is a load instruction that is moved from an original position in said sequences of instructions to an earlier position in said sequences of instructions, and wherein said at least one load instruction is moved over at least one store instruction thereby becoming an out-of-order load instruction, wherein said out-of-order load instruction identifies a location in a memory subsystem from which to read a first data and a first target register in which to place the data, a method for determining coherence among data in the first target register and the memory subsystem, the method comprising the steps of:

executing said out-of-order load instruction which controls said processor unit to read said first data from said location in memory identified by said out-of order load instruction and place said first data in said first target register identified by said out-of-order load instruction;

after performing said at least one store instruction, controlling said processor unit to perform the following steps:

reading second data from the same location in memory identified by said out-of-order load instruction, comparing said second data to said first data placed in said first target register, and executing a recovery sequence if said second data is not equal to said first data.

2. The method of claim 1, wherein said out-of-order load instruction is inserted into said sequences of instructions prior to execution of said sequences of instructions, and wherein at least one additional instruction is inserted at said original position of said load instruction to control said processor to load said second data, to compare said second data to said first data stored in said first target register, and to execute said recovery sequence if said first data and said second data are not equal.

3. The method of claim 2, wherein said second data is placed in a second target register identified by said at least one additional instruction inserted prior to execution.

4. The method of claim 3, wherein said second target register is identical to said first target register.

5. The method of claim 2, wherein said at least one additional instruction controls said processor unit to invoke a trap operation when said second data is not equal to said first data, wherein said trap operation leads to the execution of said recovery sequence.

6. The method of claim 5, wherein said second data is placed in said first target register, and wherein said at least one additional instruction is a single instruction which identifies the location in memory identified by said out-of-order load instruction and said first target register.

7. The method of claim 5, wherein said at least one additional instruction is a single instruction which identifies the location in memory identified by said out-of-order load instruction, said first target register, and said second target register.

8. The method of claim 2, wherein said at least one additional instruction controls said processor unit to branch to said recovery sequence when said second data is not equal to said first data.

9. The method of claim 8, wherein said second data is placed in said first target register, and wherein said at least one additional instruction is a single instruction which identifies the location in memory identified by said out-of-order load instruction, said first target register, and an address that identifies a memory location of said recovery sequence.

10. The method of claim 8, wherein said at least one additional instruction is a single instruction which identifies the location in memory identified by said out-of-order load instruction, said first target register, said second target register, and an address that identifies a memory location of said recovery sequence.

11. The method of claim 2, wherein said at least one instruction comprises a plurality of instructions.

12. The method of claim 11, wherein said plurality of instructions comprise a load instruction, and a compare and trap instruction.

13. The method of claim 11, wherein said plurality of instructions comprise a load instruction, and a compare and branch instruction.

14. The method of claim 11, wherein said plurality of instructions comprise a load and compare instruction, and a trap instruction.

15. The method of claim 11, wherein said plurality of instructions comprise a load and compare instruction, and a branch instruction.

16. The method of claim 11, wherein said plurality of instructions comprise a load instruction, a compare instruction, and a branch instruction.

17. The method of claim 1, wherein said out-of-order load instruction is generated concurrent with the execution of said sequences of instructions.

18. The method of claim 17, wherein, upon reaching said original position of said load instruction, said processor loads said second data, compares said second data to said first data stored in said first target register, and executes said recovery sequence if said first data and said second data are not equal.

19. The method of claim 18, wherein said second data is placed in a second target register which does not correspond to any of the architected registers of said processor.

20. The method of claim 18, wherein said second data is placed in said first target register.

21. The method of claim 18, wherein said recovery sequence is invoked as an exception.

22. In a computer processing system wherein sequences of instructions stored in a memory are executed by a processor unit, wherein said sequences of instructions include load instructions, wherein at least one of said load instructions has been moved from an original position in the sequences of instructions to an earlier position in the sequences of instructions, wherein said at least one load instruction is moved over at least one store instruction thereby becoming an out-of-order load instruction, wherein said movement is performed prior to the execution of said sequences of instructions, wherein said out-of-order load instruction identifies a location in the memory from which to read data and a first target register in which to place the data, an apparatus for executing load instructions comprising:

at least one load unit for executing said out-of-order load instruction in a first mode of operation;

wherein, in said first mode of operation, said at least one load unit reads first data from said location in memory identified by said out-of order load instruction and places said first data in said first target register identified by said out-of-order load instruction;

wherein, in a second mode of operation, said at least one load unit executes at least one additional instruction within said sequences of instructions, wherein said at least one additional instruction is located at said original position of said out-of-order load instruction, and wherein said at least one additional instruction controls said load unit to:

read second data from a location in memory identified by said one additional instruction, wherein said location in memory identified by said one additional instruction is the same location in memory identified by said out-of-order load instruction.

compare said second data to said first data stored in said first target register, and if said second data is not equal to said first data, control said processor unit to execute a recovery sequence identified by said at least one additional instruction.

23. The apparatus of claim 22, wherein said second data is stored in a second target register identified by said at least one additional instruction.

24. The apparatus of claim 22, wherein said second data is stored in said first target register identified by said at least one additional instruction.

25. The apparatus of claim 22, wherein, in said second mode of operation, said load unit controls said processor unit to invoke a trap operation that leads to the execution of said recovery sequence when said second data is not equal to said first data, wherein said trap operation is generated by a trap unit which is separate from said load unit.

26. The apparatus of claim 22, wherein, in said second mode of operation, said load unit controls a branch unit of said processor unit to branch to said recovery sequence when said second data is not equal to said first data, wherein said branch unit is separate from said load unit.

27. In a computer processing system wherein sequences of instructions stored in a memory are executed by a processor unit, wherein said sequences of instructions include load and store instructions, an apparatus comprising:

exception processing means for processing an exception generated during execution of said sequences of instructions, wherein said exception is associated with a given position in the instruction sequences, and wherein said exception processing means executes all instructions preceding said given position in said instruction sequences and discards effects of all instructions at or subsequent to said given position in said instruction sequences;

means for generating an out-of-order load instruction concurrent with the execution of said sequences of instructions, wherein said out-of-order load instruction is obtained by moving a load instruction from an original position in said instruction sequences to an earlier position in said instruction sequences over at least one store instruction, and wherein said out-of-order load instruction identifies a location in said memory from which to read said first data and said first target register where to place said first data;

execution means for executing said out-of-order load instruction thereby accessing said memory, wherein when executing said out-of-order load instruction said execution means reads said first data from a memory location identified by said out-of-order load instruction, and places said first data in said first target register;

reload means for reading second data from said memory location identified by said out-of-order load instruction subsequent to execution of all store instructions in said instruction sequences that precede said original position of said out-of-order load instruction, and prior to the execution of any store instruction in said instruction sequences succeeding said original position of said out-of-order load instruction;

comparison means for comparing said second data to said first data, and for generating an exception if said second data is not equal to said first data, wherein said exception is associated with said original position of said out-of-order load instruction in said instruction sequence.

28. The apparatus of claim 27, wherein if said second data is not equal to said first data, said reload means places said second data in said first target register, and wherein said comparison means generates an exception associated with the position immediately subsequent to said original position of said out-of-order load instruction in said instruction sequences.

29. The apparatus of claim 28, wherein said means for generating said out-of-order load instruction does not detect presence of a store instruction between said original and said earlier positions of said out-of-order load instruction, and wherein said reload means operates independent of store instructions.

30. The apparatus of claim 28, wherein said means for generating an out-of-order load instruction detects presence of said at least one store instruction by comparing a first value and a second value, wherein said first value represents the number of store instructions in said instruction sequences prior to said original position of said out-of-order load instruction, and said second value represents the number of store instructions that have been executed prior to the execution of said out-of-order load instruction.

31. The apparatus of claim 27, wherein said means for generating said out-of-order load instruction does not detect presence of a store instruction between said original and said earlier positions of said out-of-order load instruction, and wherein said reload means operates independent of store instructions.

32. The apparatus of claim 27, wherein said means for generating an out-of-order load instruction detects presence of said at least one store instruction by comparing a first value and a second value, wherein said first value represents the number of store instructions in said instruction sequences prior to said original position of said out-of-order load instruction, and said second value represents the number of store instructions that have been executed prior to the execution of said out-of-order load instruction.

\* \* \* \* \*